Dec. 11, 1962  H. WILKINSON  3,067,515
DENTAL ARTICULATOR
Filed Jan. 27, 1959  3 Sheets-Sheet 1
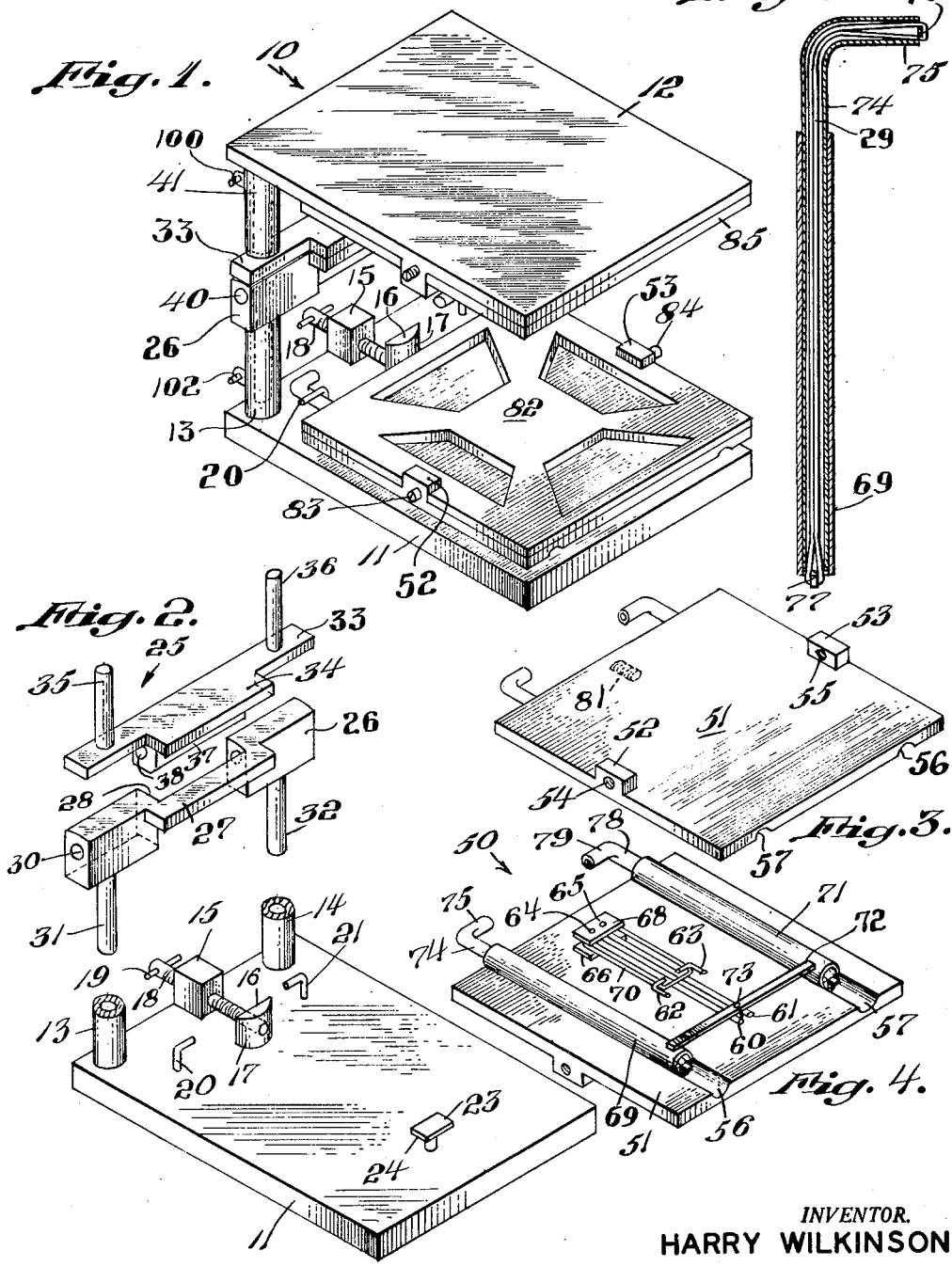
INVENTOR.
HARRY WILKINSON
BY
William Frederick Werner
ATTORNEY

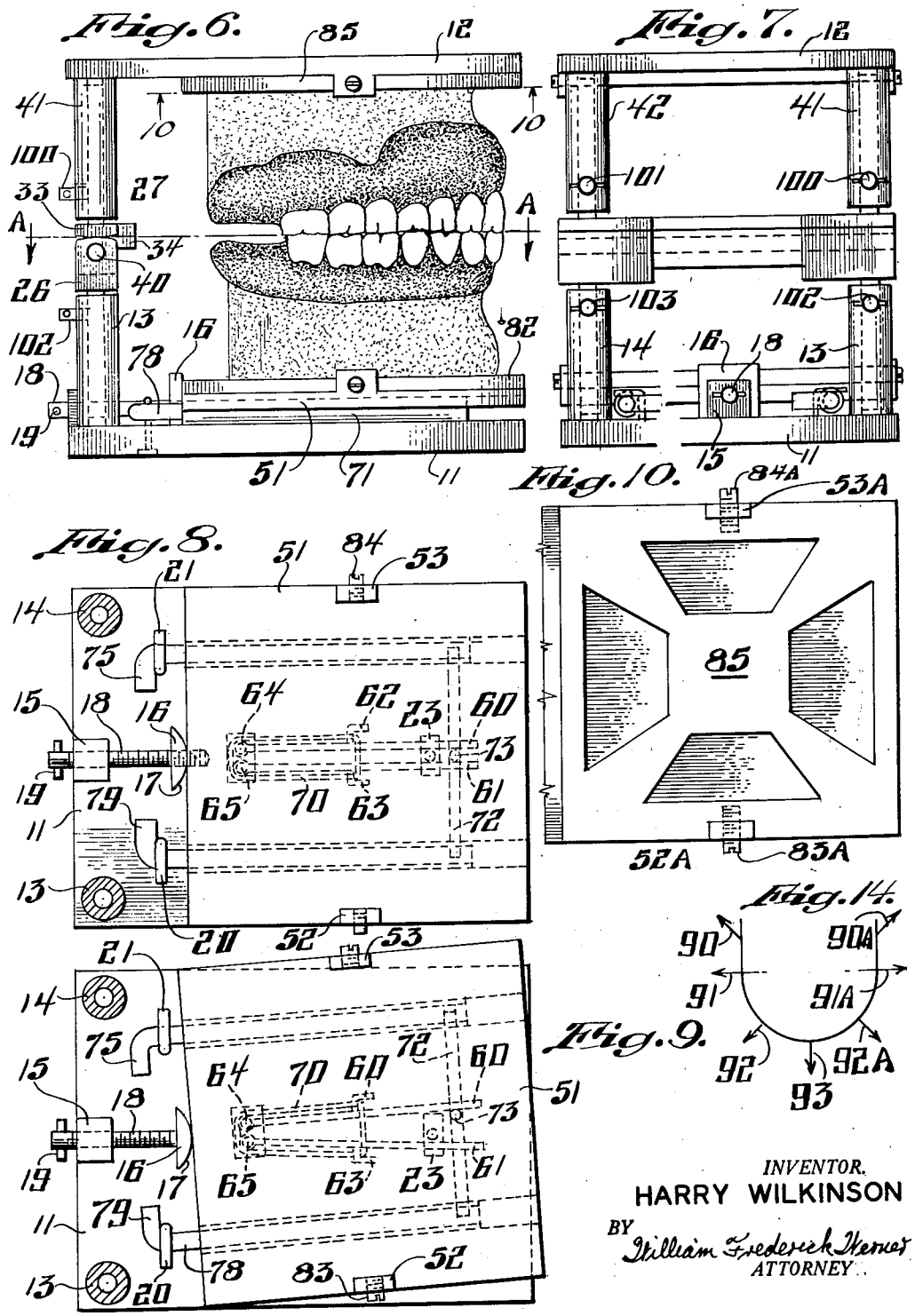

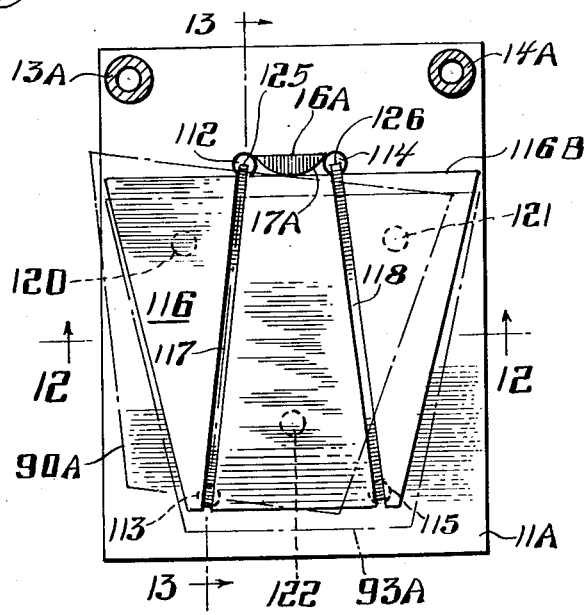
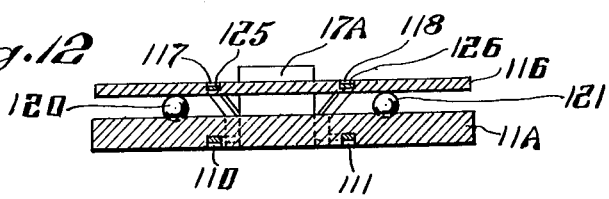
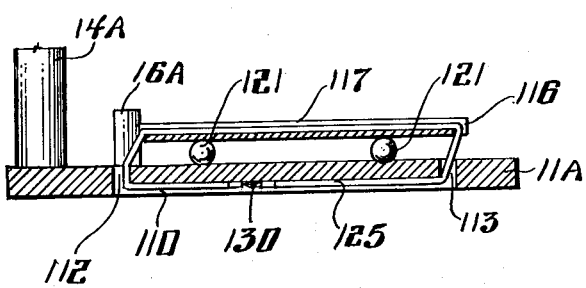

൹nited States Patent Office 3,067,515
Patented Dec. 11, 1962

3,067,515
DENTAL ARTICULATOR
Harry Wilkinson, 61 Alger Ave., East Greenwich, R.I.
Filed Jan. 27, 1959, Ser. No. 789,336
7 Claims. (Cl. 32—32)

This invention relates to dental articulators and more particularly to a pair of co-acting jaws which simulate the natural bite of a pair of human jaws, so that false teeth can be set with accurate occlusion in dental plates.

One of the principal objects of the present invention is to duplicate in a dental articulator, the natural biting and chewing movements of a human jaw.

Another object of the present invention is to provide a dental articulator consisting of a pair of co-acting jaws provided with upper and lower mounting plates. The lower mounting plate having means to swerve horizontally. The upper mounting plate having means to pivot vertically. The co-acting jaws and mounting plates co-act to produce a movement between the mounting plates wherein the natural movement of mastication is duplicated, i.e., leaning the condyles forward and pulling the jaw angle back on the theoretical fulcrum of the center of the rami shaft.

Prior art dental articulators produced a circular motion which represented an unnatural movement of the maxillary and mandibular teeth during mastication.

The present invention is predicated upon the theory that mastication is not a circular motion but a reciprocating motion of the mandibular teeth in relation to the maxillary teeth.

The present dental articulator produces the natural flexible motion of reciprocation during simulated mastication operations. The natural flexible motion of reciprocation is defined as a swerving motion which unites the vertical movement of the upper jaw or maxillary with the horizontal swerving movement of the lower jaw or mandibular to form oblique angle lines controlled and operated by muscular flexions of the maxillo mandibular.

The vertical movement of the maxillary or upper natural jaw is reproduced by hinge 25 and upper jaw 12 in the instant articulator. The horizontal swerving movement of the mandibular or lower jaw and the resultant oblique angle lines are reproduced by swerving plate 50 mounted upon lower jaw 11.

Other objects of the present invention will be pointed out in part and become apparent in part in the following specification and claims.

Referring to the drawings in which similar characters of reference indicate corresponding parts in all the figures:

FIGURE 1 is a perspective view of the new and improved dental articulator.

FIGURE 2 is an exploded perspective view similar to FIGURE 1 with the upper jaw and upper and lower mounting plates removed.

FIGURE 3 is a top plan view in perspective of the swerving plate.

FIGURE 4 is a bottom plan view in perspective of the swerving plate.

FIGURE 5 is a transverse cross sectional view of one of the horizontal swerving fulcrums.

FIGURE 6 is a side elevational view of FIGURE 1 with upper and lower artificial dentures added to the upper and lower mounting plates.

FIGURE 7 is a rear elevational view of FIGURE 1.

FIGURE 8 is a plan view of the swerving plate attached to the lower jaw.

FIGURE 9 is a plan view similar to FIGURE 8 showing the swerving positional relationship of the swerving plate to the lower jaw.

FIGURE 10 is a view taken along line 10—10 of FIGURE 6.

FIGURE 11 is a plan view of a modified form of swerving plate showing the swerving plate mounted upon the lower jaw.

FIGURE 12 is a transverse cross sectional view taken on line 12—12 of FIGURE 11.

FIGURE 13 is another transverse cross sectional view taken along line 13—13 of FIGURE 11.

FIGURE 14 is a diagram of the oblique angles of movement of the lower jaw (mandibular).

Referring to the drawings and particularly FIGURES 1 and 2 where reference character 10 generally indicates the new and improved dental articulator, consisting of a flat rectangularly shaped plate, termed a lower jaw 11 and a second flat rectangularly shaped plate, termed an upper jaw 12.

Lower jaw 11 is provided on one end with two oppositely disposed hollow sleeves 13, 14 secured to lower low 11 as by soldering, welding or the like. A block 15, provided axially with a screw thread, is fixed to lower jaw 11 midway between and in horizontal alignment with hollow sleeves 13, 14. A guide member 16 provided axially with a screw thread which is in axial alignment with the screw thread in block 15, is fixed to lower jaw 11. Guide member 16 is provided with an arcuate face 17 for purposes which will presently appear. A threaded shaft 18 provided with a handle 19 is rotatively mounted in both block 15 and guide member 16. Two oppositely located pins 20, 21 bent at ninety degree angles to face each other, are fixed in lower jaw 11 and are in approximate horizontal alignment and equidistant from guide member 16. A T shaped stop 23 having a shoulder 24 is fixed in lower jaw 11 in axial alignment with threaded shaft 18.

A hinge connection generally indicated by reference character 25 is provided, consisting of a lower member 26 and an upper member 33. Lower member 26 is provided with a lower platform 27, a recess 28 and a transverse bore 30 extending throughout its width. Two oppositely disposed posts 31, 32 fixed in lower member 26 are removably secured in hollow sleeves 13, 14, respectively. Upper member 33 is provided with an upper platform 34, two oppositely disposed posts 35, 36 fixed in upper member 33 and a projection 37 having an axial passageway 38. Projection 37 is pivotally mounted in recess 28 by means of a pintle 40 which passes through transverse bore 30 and axial passageway 38. Upper platform 34 abuts lower platform 27 in one pivoted position as will presently appear. (See FIGURES 1 and 6.)

Upper jaw 12 is provided on one end with two oppositely disposed hollow sleeves 41, 42. Hollow sleeves 41, 42 are secured to upper jaw 12 by means of welding, brazing, soldering etc. Posts 35, 36 are removably secured in hollow sleeves 41, 42.

Referring to FIGURES 3, 4, 8 and 9 swerving plate generally indicated by reference character 50, consists of a flat rectangularly shaped plate 51 having two oppositely disposed lugs 52, 53 projecting from the upper side edges approximately mid-way of the length of said plate. Lugs 52, 53 are provided axially with threaded areas 54, 55. Plate 51 is provided with two parallel arcuate grooves 56, 57 which extend the full length of said plate. Two parallel arms 60, 61 provided with fingers 62, 63 respectively, are pivotally mounted to lower jaw 11 by means of pins 64, 65 respectively. A washer 66 is interposed between arms 60, 61 and plate 51. A retaining washer 68 is secured to pins 64, 65, abutting arms 60, 61. A resilient means 70 illustrated as an elastic band but which could take the form of a spring member is located between washers 66, 68 and is slidably attached to fingers 62, 63 to resiliently hold parallel arms 60, 61 in parallel relationship.

Two hollow tubes 69, 71 are secured respectively in parallel arcuate grooves 56, 57. A bar 72 provided with a pin 73 fixed in swerving plate 51 is secured on opposite ends to hollow tubes 69, 71 respectively.

Referring to FIGURE 5, wherein is illustrated one of the horizontal swerving fulcrums consisting of the hollow tube 69 and a second hollow tube 74 having a ninety degree projection forming a neck 75. Neck 75 is provided with a cross bar 76. Hollow tube 69 is provided with a cross bar 77 in the end opposite the neck 75 end of tube 74. A spring or an elastic band 29 as illustrated, is secured on opposite ends to cross bars 76, 77 to resiliently retain hollow tube 74 within hollow tube 69. Similarly hollow tube 71 is provided with a second hollow tube 78 having a ninety degree projection forming a neck 79 and resilient means to resiliently retain hollow tube 78 within hollow tube 71. A screw thread 81 is axially located in plate 51.

Swerving plate 50 is attached to lower jaw 11 with T shaped stop 23 located between parallel arms 60, 61 and shoulder 24 abutting parallel arms 60, 61 when they are in parallel position. Necks 75, 79 underlie and abut pins 21, 20 upon which necks 75, 79 respectively, fulcrum. Threaded shaft 18 engages threads 81 to hold plate 51 against arcuate face 17, thereby providing a locking point for swerving plate 50.

A lower mounting plate 82 conventional to the denture art is secured to swerving plate 51 by means of lugs 52, 53 and set screws 83, 84, rotatively mounted in threaded areas 54, 55 respectively. Similarly, an upper mounting plate 85 is secured to upper jaw 12 through lugs 52A, 53A, having set screws 83A, 84A rotatively mounted therein, respectively.

In operation and practice, a dental technician takes an impression of the upper (maxillary) gum and of the lower (mandibular) gum. Plaster casts are then made from the impressions. Wax trial plates are then formed over the respective plaster casts. Upper mounting plate 85 and lower mounting plate 82 are then provided with plaster. The plaster cast of the upper gum with wax trial plate attached is embedded and fixed in the plaster on upper mounting plate 85. The plaster cast of the lower gum with wax trial plate attached is embedded and fixed in the plaster on lower mounting plate 82. After the plaster casts with wax trial plates attached are fixed in the plaster of the respective mounting plates, a technician inserts false teeth in the trial plates, thus producing a pair of dentures.

Upper jaw 12 is adjusted in relation to lower jaw 11 by sliding hollow sleeves 41, 42 upon posts 35, 36, respectively. Thumb screws 100, 101 secure hollow sleeves 41, 42 respectively, in adjusted position. Similarly, lower jaw 11 is adjusted in relation to upper jaw 12 by sliding hollow sleeves 13, 14 upon posts 31, 32, respectively. Thumb screws 102, 103 secure hollow sleeves 13, 14, respectively, in adjusted position.

The engaging surfaces of platforms 27, 34 determine the line of occlusion (A—A FIGURE 6) and limit the forward pivotal movement of upper jaw 12. The teeth of upper plate 85 and the teeth in lower plate 82 intermesh on the line of occlusion. Intermesh is the natural engagement of the maxillary teeth with the mandibular teeth when the jaws are closed.

Posts 35, 36, 31, 32 adjustably mounted in their respective hollow sleeves make the line of occlusion adjustable by adjusting the upper jaw 12 and the lower jaw 11 in relation to hinge 25.

The intermesh of the teeth bears the natural weight of upper jaw 12 and upper plate 85 upon actuation of swerving plate 50 which causes upper jaw 12 to pivot around rami shaft 40 through hinge 25.

The engagement of the teeth in the articulator is to determine and create an occlusion between the upper and lower teeth and thereby form a clearance between cusps and interspaces. Thus to arrange an organized occlusion.

If the teeth fail to mesh properly, a hot iron is placed against the wax trial plate to free the tooth so that it can be reset in proper mesh or occlusion with the other teeth.

After the proper occlusion is made between the teeth in static position the articulator is manually manipulated to duplicate the motions of mastication, biting and chewing to insure the proper functioning of the dentures in the subject's mouth.

The natural flexible motion of reciprocation is reproduced by the present dental articular by causing swerving plate 50 to swerve on lower jaw 11 in relation to upper jaw 12 through manual manipulation. This is accomplished as follows.

Threaded shaft 18 is withdrawn from threads 81 thereby releasing plate 51 to an action which is governed by necks 75, 79 yieldingly engaging pins 20, 21 and parallel arms 60, 61 yieldingly engaging T shaped stop 23. Plate 51 slides across lower jaw 11 in a motion which duplicates the chewing action of human jaws, namely, leaning the condyles forward and pulling the jaw angle back on the theoretical fulcrum of the center of the rami shaft. The center of the rami shaft in the articulator is the center of pintle 40. FIGURE 9 illustrates one position of the swerving motion of plate 51.

During this swerving motion the upper jaw 12 is caused to lift up and down by pivoting around pintle 40. However, hinge 25 is so constructed that second platform 34 engaging first platform 27 limits the forward pivoting movement of hinge 25 and consequently of upper jaw 12. Platforms 34, 27 engage with a force equal to the weight and leverage of upper jaw 85 and the parts attached thereto.

FIGURE 14 diagrammatically illustrates the segments of movement of the lower jaw (mandibular). Lines 90, 90A represent the distolateral segmental movement of the lower jaw. Lines 91, 91A represent the intermediate segmental movement of the lower jaw. Lines 92, 92A represent the protrusive segmental movement of the lower jaw. And line 93 represents the incisive segmental movement of the lower jaw.

These segmental movements of the natural lower jaw produce the actions of tearing, crushing, munching, triturating and chopping between the maxillary and mandibular teeth when the maxilla moves up and down and the mandible swerves horizontally.

These segmental movements represented by oblique angle lines produce oblique angle motions of the mandible termed sidle and sidling motions and are deemed to be the natural masticating motions of the lower jaw (mandible). Other terms for these segmental movements are lateral and protrusive.

These oblique angle motions are duplicated by swerving plate 50 through parallel arms 60, 61 yieldingly engaging T shaped stop 23 and necks 75, 79 yieldingly engaging pins 20, 21 as plate 51 is horizontally swerved upon lower jaw 11. The upper jaw 12 moves up and down in relation to lower jaw 11 as it pivots around pintle or rami shaft 40 to reproduce the natural cooperating movements of the maxillary and mandibular teeth.

The occlusal plane (A—A) of the denture or wax trial plates is always on a level with the hinge opening. That is, the occlusal plane is a plane parallel to the engaging surfaces of platforms 27 and 34.

Referring to FIGURES 11, 12 and 13 wherein is illustrated a modified form of swerving plate. Reference character 11A indicates the lower jaw; the counterpart of lower jaw 11 shown in FIGURES 1, 2, 6, 7, 8 and 9. Lower jaw 11A is provided with hollow sleeves 13A and 14A adapted to receive posts 31, 32 respectively. A guide member 16A having an arcuate face 17A is secured to lower jaw 11. Lower jaw 11A is provided with two grooves 110, 111 in the base. Grooves 110, 111 terminate in orifices 112, 113 and 114, 115, respectively. A swerving plate in the form of a flat triangularly shaped plate 116 is provided with two grooves 117, 118. Three ball bearings 120, 121 and 122 are interposed between flat triangularly shaped plate 116 and lower jaw 11A. Lower jaw 11A may be provided with three recesses to seat the ball bearings 120, 121 and 122.

A resilient member 125 in the form of a looped spring or endless elastic member is laid in groove 117 and passed through orifices 112, 113. Resilient member 125 is then laid in groove 110 and the ends united as at 130 to unite the ends and form a loop. Similarly, a second resilient member 126 in the form of a looped spring or endless elastic member is laid in groove 118 and passed through orifices 114, 115. Resilient member 126 is then layed in groove 111 and the ends are united to form a loop or endless elastic member. The ends may be secured in grooves 110 or 111 instead of being united. The resilient members would function as a looped member.

In operation flat triangularly shaped plate functions in a manner identical with swerving plate 50. Orifices 112 and 114 (see FIGURE 13) have their forward edges behind the forward edge of arcuate face 17A, so that elastic members 117, 118 yieldingly urge flat triangularly shaped plate 116 against arcuate face 17A. Grooves 110, 111 and 117, 118 taper rearwardly, so as to yieldingly urge plate 116 against arcuate face 17A in a manner to center the back edge 116B against said arcuate face 17A.

Flat triangularly shaped plate 116 can be manually manipulated upon ball bearings 120, 121, 122 in oblique angle movements in accordance with FIGURE 14 as previously described for swerving plate 50. The dot and dash outlines 90A, 93A of plate 116 illustrated in FIGURE 11 correspond to movements 90 and 93 in FIGURE 14. A lower mounting plate 82 would be secured to swerving plate 116 as by adhesives, screw fastening, welding or brazing.

Having shown and described preferred embodiments of the present invention, by way of example, it should be realized that structural changes could be made and other examples given without departing from either the spirit or scope of this invention.

What I claim is:

1. A dental articulator comprising a lower jaw, an upper jaw, a hinge connection pivotally connecting said upper jaw to said lower jaw, said jaws being movable about said hinge connection, a swerving plate mounted upon said lower jaw for segmental movement relative to said jaws, and two fixed abutments at the hinge connection adapted to engage each other for limiting relative movement between said jaws in one direction at said hinge connection and to provide a plane of occlusion between said jaws.

2. A dental articulator consisting of a lower jaw, an upper jaw, a hinge connection between said lower and upper jaw, two fixed abutments at said hinge connection adapted to engage each other for limiting relative movement between said upper jaw and lower jaw in one direction, a swerving plate mounted on said lower jaw for lateral and protrusive movement thereto, said upper plate being adapted to receive the upper set of a pair of dentures, said swerving plate being adapted to receive the lower set of a pair of dentures, so that said dentures will be moved at an oblique angle relative to each other upon simultaneous relative movement between said upper jaw and said swerving plate and lower jaw about said hinge connection and said lateral movement of said swerving plate relative to said lower jaw.

3. A dental articulator consisting of a lower jaw, an upper jaw, a hinge connection pivotally connecting said upper jaw to said lower jaw, two fixed abutments at said hinge connection adapted to engage each other for limiting relative movement between said upper jaw and said lower jaw in one direction, a swerving plate, means to mount said swerving plate to said lower jaw for lateral and protrusive movement thereto, said upper jaw being adapted to receive an upper set of a pair of dentures, said swerving plate being adapted to receive a lower set of a pair of dentures, so that said dentures engage in a plane passing through the plane of engagement of said two abutments and are movable at an oblique angle relative to each other upon simultaneous relative pivotal movement of said upper jaw around said hinge connection and said swerving plate lateral and protrusive movement relative to both said lower and upper jaws.

4. A dental articulator consisting of a lower jaw, a hinge consisting of a lower member provided with a platform, an upper member provided with a platform and a pintle pivotally uniting said lower and upper members, said platforms engaging to limit the forward pivotal movement of said hinge, said lower member adjustably fixed to said lower jaw, an upper jaw, said upper member adjustably fixed to said upper jaw, an upper mounting plate secured to said upper jaw adapted to receive an upper set of a pair of dentures, a swerving plate, means mounting said swerving plate to said lower jaw for horizontal oblique angle swerving movement thereto, a lower mounting plate secured to said swerving plate adapted to receive a lower set of a pair of dentures, said platforms engaging in a horizontal plane which passes through the occlusal plane of the pair of dentures, said upper jaw pivoting toward and away from said lower jaw around said pintle, and said swerving plate moving horizontally relative to said upper jaw in an oblique angle swerving motion.

5. A dental articulator consisting of a lower jaw provided with two oppositely disposed hollow sleeves, a block provided axially with a screw thread secured to said lower jaw midway between and in horizontal alignment with said two hollow sleeves, a guide member provided with an arcuate face and provided axially with a screw thread, fixed to said lower jaw with said last mentioned screw thread in axial alignment with said first mentioned screw thread, two oppositely located pins bent at ninety degree angles to face each other, fixed in said lower jaw in approximate horizontal alignment and equidistant from said guide member, a T shaped stop fixed in said lower jaw in axial alignment with said screw threads, a threaded shaft rotatively located in both said screw threads, a hinge connection consisting of a lower member having a first platform, an upper member having a second platform and a pintle means pivotally connecting said upper member to said lower member with said first and second platforms limiting the forward pivotal movement of said hinge connection, two oppositely disposed posts fixed in said lower member and adjustably fixed in said two oppositely disposed hollow sleeves, an upper jaw provided with a second set of two oppositely disposed hollow sleeves, a second set of two oppositely disposed posts fixed in said upper member and adjustably secured in said second set of two oppositely disposed hollow sleeves, a swerving plate consisting of a flat rectangularly shaped plate having two parallel arcuate grooves, two parallel arms pivotally mounted to said plate, means to resiliently urge said two parallel arms toward each other, said arms yieldingly abutting opposite sides of said T shaped stop, two hollow tubes secured respectively in said two parallel arcuate grooves, two horizontally swerving fulcrums provided with ninety degree projections forming necks on one end of each fulcrum respectively, slidingly mounted respectively in said two hollow tubes, resilient means in each hollow tube to yieldingly hold the respective horizontal swerving fulcrum in the respective hollow tube, said necks yieldingly engaging respectively said two oppositely located pins to thereby allow said flat rectangularly shaped plate to horizontally move upon said lower jaw in oblique angle, lateral and protrusive directions, said arcuate face abutting one edge of said flat rectangularly shaped plate to align said plate in parallel relation to said upper jaw and a screw thread in one edge of said flat rectangularly shaped plate engageable with said threaded shaft to insure said alignment and disengageable with said shaft to free said flat rectangularly shaped plate to movement in said oblique angle, lateral and protrusive directions.

6. A dental articulator consisting of a lower jaw, an upper jaw, a hinge connection pivotally connecting said upper jaw to said lower jaw, means to limit the forward pivotal movement of said hinge, a second means to adjustably position said upper jaw in spaced relation to said hinge connection, a third means to adjustably position said lower jaw in relation to said hinge connection, a swerving plate, means to mount said swerving plate upon said lower jaw for lateral and protrusive horizontal movement thereon, said upper plate being adapted to receive the upper set of a pair of dentures, said swerving plate being adapted to receive the lower set of a pair of dentures, the occlusal level of said pair of dentures passing through said hinge connection, so that said pair of dentures will be moved at an oblique angle relative to each other upon simultaneous relative pivotal movement of said jaws around said hinge connection and the lateral and protrusive horizontal movement of said swerving plate.

7. A dental articulator consisting of a lower jaw, a hinge consisting of a lower member provided with a first platform, an upper member provided with a second platform and a pintle pivotally uniting said lower and upper members, said first and second platforms engaging to limit the forward pivotal movement of said hinge, said lower member adjustably fixed to said lower jaw, an upper jaw, said upper member adjustably fixed to said upper jaw, an upper mounting plate secured to said upper jaw adapted to receive an upper set of a pair of dentures, a guide member, having an arcuate face, fixed in said lower jaw, a swerving plate, resilient means yielding holding said swerving plate against the arcuate face of said guide member, said swerving plate slidably mounted upon said lower jaw for horizontal oblique angle swerving movement, a lower mounting plate secured to said swerving plate adapted to receive a lower set of a pair of dentures, said first and second platforms engaging in a horizontal plane which passes through an occlusal plane of a pair of dentures, said upper jaw pivoting toward and away from said lower jaw around said pintle.

References Cited in the file of this patent

UNITED STATES PATENTS

| | | |
|---|---|---|
| 1,285,986 | Babb | Nov. 26, 1918 |
| 1,986,628 | Edwards | Jan. 1, 1935 |